P. M. HENNEGAN.
ADVERTISING OR DISPLAY NOVELTY.
APPLICATION FILED OCT 31, 1919.

1,389,551.

UNITED STATES PATENT OFFICE.

PAUL M. HENNEGAN, OF CINCINNATI, OHIO, ASSIGNOR TO FRANK D. SPOTSWOOD, OF LEXINGTON, KENTUCKY.

ADVERTISING OR DISPLAY NOVELTY.

1,389,551.   Specification of Letters Patent.   Patented Aug. 30, 1921.

Application filed October 31, 1919. Serial No. 334,789.

*To all whom it may concern:*

Be it known that I, PAUL M. HENNEGAN, a citizen of the United States, residing at the city of Cincinnati, in the county of Hamilton and State of Ohio, have invented certain new and useful Improvements in Advertising or Display Novelties, of which the following is a specification.

My invention belongs to that class of advertising or display novelties known as "dummies", used to attract attention and arouse the curiosity of the prospective purchaser or impress the looker on and to attract others, and provided with a hidden word or advertisement, which, by manipulating some part of the dummy figure, is displayed to view; thus advertising the goods, or any article, or subject matter desired; in this way being of financial interest to the user thereof. This article may also be used as a souvenir, greeting, post card, as a print or for general display use.

Dummies of this kind may be of any desired form and contour and produced to illustrate any subject matter either in approximately perfect outline, appearance or expression, or they may be exaggerated or distorted in expression and contour.

In the illustration, I have shown a young dog or puppy and a Japanese woman. I can, of course, show any other figure or illustrate any other subject in a dummy form. I may make an illustration of an animate or inanimate subject.

These dummy figures or forms are usually cut out of paper, but they may be cut out of any other material found desirable, and they are printed or painted to bring out the subject matter they are supposed to portray, and they may be lithographed or embossed, or otherwise ornamented for attraction, and they may be exaggerated to attract.

Figure 1:
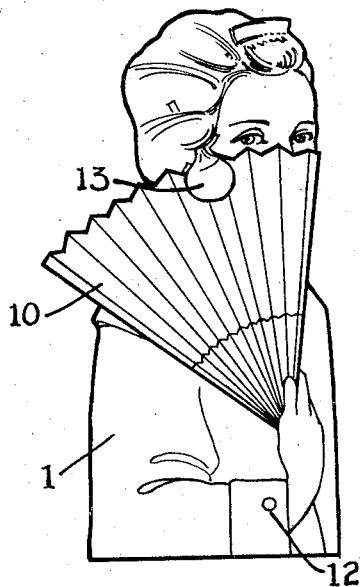
Figure 2:
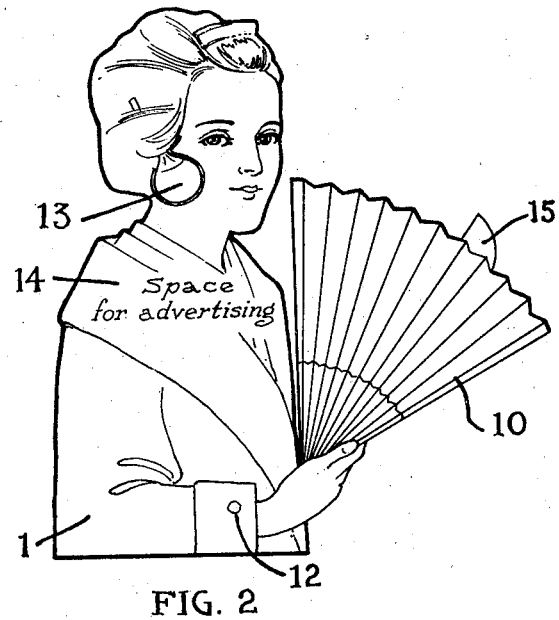
Figure 3:
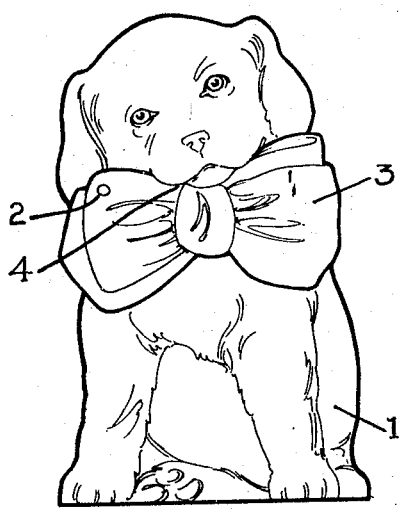
Figure 4:
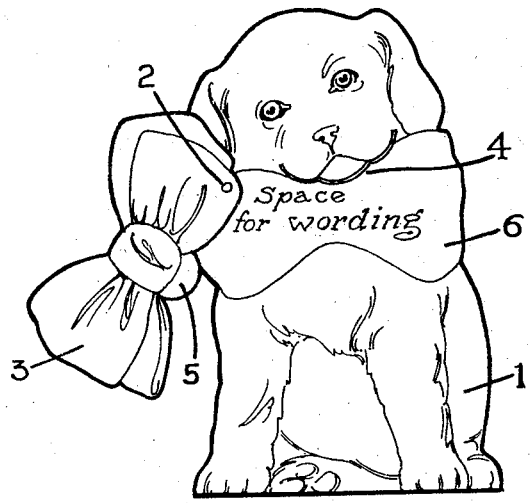

In the accompanying drawing, forming part of this specification:

Figure 1 is a view in elevation of a Japanese woman holding a fan, being a bust figure; the fan hiding the advertising matter, (in this instance), Fig. 2, is a similar view, except that the fan has been swung forward and downward to show the advertising, (in this instance), Fig. 3, is a view in elevation of a young dog or puppy, in a sitting position, wearing a tie, the tie hiding a space marked (space for wording), and Fig. 4, is a similar view, except that the tie has been swung laterally and downward to expose the space for wording.

In the drawing, the numeral 1 represents the dummy in each view. On the dummy dog, I pivotally connect to the body at the point 2, a tie or bow 3, and in the body part, in the present instance, at the mouth, I place a slit or slot 4; on the bow or tie I place a tongue or projection 5, which fits into the slit 4. The advertisement, display words or any words or characters are placed on the space 6, marked for advertising in Fig. 2 and "space for wording" in Fig. 4. The bow 3 swings on the pivotal point 2 and when the bow is in normal position, as shown in Fig. 3, it hides the space 6 and when swung on the pivot 2, it exposes the space 6, as shown in Fig. 4.

In Fig. 1, the Japanese lady is holding a fan marked 10, which is pivoted to swing on the pivotal point 12. In this illustration, instead of cutting a slit in the dummy figure, I place a flap as 13 on the same; this holds the fan until it, as shown in Fig. 1, when in normal position and when the fan 10 is swung forward and downward the advertising space 14 is exposed. This space may be used to display words or characters other than advertising, if desired. I may place an addendum as 15 on the fan or moving part of the dummy, if desired, to more effectively hold it in place when in normal position.

I may attach the movable part of the dummy thereon in any desirable manner other than herein shown. The movable part of the dummy may be formed out of any part of its body or may be an extraneous subject matter or part, as will best serve the subject to be advertised and the character of the advertisement, or to best show the display words or characters in the space provided.

These dummy figures may be made to "stand up" or lie down or to be in any other position on the counter, shelf or place they are placed.

The invention may be referred to as the "hidden word" novelty.

The space indicated in the drawing for "advertising matter" or for "space for wording" may be of any size and shape and be placed on any part of the dummy figure, and this "hidden space" may have any printing matter thereon, or any character or print, or display words or slogans or epitome, best suited for advertising, display, souvenir use, post cards, greeting cards, announcements or the like, and when used for the different purposes and ways herein enumerated the dummy figure must be formed and prepared in a manner best suited for the use to which it is to be adapted and I do not limit myself to any contour, construction, combination of parts in "making up" said dummy figure, having only described it herein specifically for the purposes of the patent law.

What I claim as new and my invention and desire to secure by Letters Patent, is:

In an advertising or display novelty of the character described, an independent dummy figure having a word space thereon, and a movable part attached to said dummy, capable of being moved off of said word space to expose the same and capable of being moved onto said word space to hide the same, a slitted part on the dummy and a tongue on the movable part, coacting to lock the movable part on the dummy, when in normal position.

In testimony whereof, I affix my signature at Cincinnati, Ohio, this 22nd day of October, 1919.

PAUL M. HENNEGAN.